US012754976B2

(12) United States Patent
Schwinn et al.

(10) Patent No.: US 12,754,976 B2
(45) Date of Patent: Oct. 6, 2026

(54) MONITORING A MULTI-AXIS MACHINE USING INTERPRETABLE TIME SERIES CLASSIFICATION

(71) Applicant: KUKA Deutschland GmbH, Augsburg (DE)

(72) Inventors: Jonas Schwinn, Diedorf (DE); Jonas Reiher, Aachen (DE)

(73) Assignee: KUKA Deutschland GmbH (DE)

( * ) Notice: Subject to any disclaimer, the term of this patent is extended or adjusted under 35 U.S.C. 154(b) by 0 days.

(21) Appl. No.: 18/866,284

(22) PCT Filed: May 11, 2023

(86) PCT No.: PCT/EP2023/062634

§ 371 (c)(1), (2) Date: Nov. 15, 2024

(87) PCT Pub. No.: WO2023/232428

PCT Pub. Date: Dec. 7, 2023

(65) Prior Publication Data

US 2025/0322037 A1 Oct. 16, 2025

(30) Foreign Application Priority Data

May 31, 2022 (DE) ..................... 10 2022 205 534.9

(51) Int. Cl.

*G06F 11/00* (2006.01)
*G06F 11/07* (2006.01)
*G06F 18/241* (2023.01)

(52) U.S. Cl.

CPC ........ *G06F 18/241* (2023.01); *G06F 11/0736* (2013.01); *G06F 11/079* (2013.01)

(58) Field of Classification Search

CPC .... G06F 11/0736; G06F 11/079; G06N 20/00

(Continued)

(56) References Cited

U.S. PATENT DOCUMENTS 9,030,316 B2 * 5/2015 Libal .................... G08B 25/008 714/48
11,381,506 B1 * 7/2022 Jindal ................. H04L 67/1004

(Continued)

FOREIGN PATENT DOCUMENTS

DE 102008032885 A1 1/2010
DE 102019219300 A1 7/2021

(Continued)

OTHER PUBLICATIONS

European Patent Office; Search Report in related International Patent Application No. PCT/EP2023/062634 dated Aug. 3, 2023; 5 pages.

(Continued)

*Primary Examiner* — Sarai E Butler

(74) *Attorney, Agent, or Firm* — Dorton & Willis, LLP

(57) ABSTRACT

A method for assessing and/or monitoring a process and/or a multi-axis machine includes recording at least one data time series, wherein the at least one data time series includes at least one channel describing at least one parameter of the process and/or of the multi-axis machine, and wherein the data time series is caused by the process. An interpretable result is determined by a machine learning algorithm based on the at least one data time series, wherein the result describes a classification value of a state in the process and/or of a state of the multi-axis machine. A warning is output when determining the result if the classification value of the state in the process and/or of the state of the multi-axis machine is assigned to a value of an error class that is in a warning range or corresponds to a warning range, and an all-clear signal is output if the classification value of the state in the process and/or of the state of the multi-axis machine is assigned to a value of an error class that is in an all-clear range or corresponds to an all-clear range.

11 Claims, 2 Drawing Sheets

(58) Field of Classification Search
USPC .......................................................... 714/1-57
See application file for complete search history.

(56) References Cited

U.S. PATENT DOCUMENTS

| | | | | |
|---|---|---|---|---|
| 11,656,932 | B2 * | 5/2023 | Mahamuni .......... | G06F 11/3409 714/48 |
| 2004/0237005 | A1 * | 11/2004 | Adkisson ............ | G06F 11/0724 714/E11.023 |
| 2005/0204274 | A1 * | 9/2005 | Kamp ................. | G06F 11/1048 714/801 |
| 2007/0005266 | A1 | 1/2007 | Blevins et al. | |
| 2008/0059840 | A1 * | 3/2008 | Takezawa ............. | G06F 11/008 714/37 |
| 2009/0012748 | A1 * | 1/2009 | Beish .................. | G06F 11/3636 702/187 |
| 2009/0049338 | A1 * | 2/2009 | Unnikrishnan .... | G05B 23/0281 714/E11.002 |
| 2009/0282296 | A1 * | 11/2009 | Lin ...................... | G05B 23/024 714/E11.029 |
| 2011/0276823 | A1 * | 11/2011 | Ueno .................. | G06F 11/1464 714/E11.073 |
| 2012/0210171 | A1 * | 8/2012 | Lawler .................... | H04L 67/10 714/E11.178 |
| 2014/0250337 | A1 * | 9/2014 | Yamaji ............... | G05B 19/4184 714/39 |
| 2019/0114214 | A1 * | 4/2019 | Rope ................... | G06F 11/0751 |
| 2019/0340392 | A1 * | 11/2019 | Khorrami ........... | G06F 11/3612 |
| 2020/0166909 | A1 * | 5/2020 | Noone ................... | G06N 20/00 |
| 2020/0233397 | A1 | 7/2020 | Bello et al. | |
| 2021/0357282 | A1 * | 11/2021 | Verma .................. | G06N 3/0455 |
| 2022/0197714 | A1 * | 6/2022 | Raumann ............ | G06F 11/2236 |
| 2023/0244674 | A1 * | 8/2023 | Jambigi ................ | G06F 16/252 714/25 |
| 2023/0305945 | A1 * | 9/2023 | Ratho ................... | G06F 11/328 |

FOREIGN PATENT DOCUMENTS

| | | | |
|---|---|---|---|
| DE | 202021104953 | U1 | 9/2021 |
| DE | 112020001792 | T5 | 1/2022 |
| EP | 3620983 | A1 | 3/2020 |

OTHER PUBLICATIONS

German Patent Office; Examination Report in related German Patent Application No. 10 2022 205 534.9 dated Jan. 31, 2023; 7 pages.

Ferreira, Victor H. et al. "Probabilistic transmission line fault diagnosis using autonomous neural models," Electronic Power Systems Research, Elsevier, Amsterdam, NL; vol. 185, May 11, 2020 (May 11, 2020); DOI: 10.1016/J.EPSR.2020.106360; ISSN: 0378-7796; XP086177452; p. 1-p. 4.

* cited by examiner

MONITORING A MULTI-AXIS MACHINE USING INTERPRETABLE TIME SERIES CLASSIFICATION

CROSS-REFERENCE TO RELATED APPLICATIONS

This application is a national phase application under 35 U.S.C. § 371 of International Patent Application No. PCT/EP2023/062634, filed May 11, 2023 (pending), which claims the benefit of priority to German Patent Application No. DE 10 2022 205 534.9, filed May 31, 2022, the disclosures of which are incorporated by reference herein in their entirety.

TECHNICAL FIELD

The present invention relates to a method for evaluating and/or monitoring a process and/or a multi-axis machine, a system for operating and/or monitoring a multi-axis machine, and a computer program or computer program product.

SUMMARY

The object of the present invention is to improve a process, in particular a process of a multi-axis machine, and further in particular to reduce and/or avoid errors in the process, in particular error states in the multi-axis machine.

This object is achieved by a method, a system for operating and/or monitoring a multi-axis machine, and a computer program or computer program product, for carrying out a method as described herein.

According to one embodiment of the present invention, a method for evaluating and/or monitoring a processor and/or for monitoring a multi-axis machine comprises recording at least one data time series. In one embodiment, the at least one data time series comprises at least one channel, wherein the channel describes at least one parameter of the process and/or the multi-axis machine, in particular over a (predetermined) time interval. In one embodiment, the data time series is caused by the process. In one embodiment, the method comprises determining an interpretable result using a machine learning algorithm based on the at least one data time series. In one embodiment, the result describes a classification value of a state in the process and/or a state of the multi-axis machine. In one embodiment, determining the interpretable result further comprises outputting a warning if the classification value of the state in the process and/or the state of the multi-axis machine is assigned to a value of an error class that is in a warning range, in particular a predetermined and/or learned one, or corresponds to a warning range, and/or outputting an all-clear signal if the classification value of the state in the process and/or the state of the multi-axis machine is assigned to a value that is in a warning range, in particular a predetermined and/or learned one, or corresponds to an all-clear range.

A "channel" is preferably to be understood herein as a data channel, a data time series preferably as data of at least one data channel recorded over time. In one embodiment, a channel provides data of the process and/or the multi-axis machine, in particular position data, acceleration data, current data, temperature data and/or status messages. The data may, in one embodiment, be recorded in a file, diagram or the like, for example in a KRC-Diag, a similar data set or diagram or the like.

An "interpretable result" is preferably to be understood herein as a result that is readable and understandable by a user, in particular as a result that allows the user to draw direct conclusions about the (existing) channels, further in particular about a point in time and/or a period of time within the at least one channel and/or across all existing channels. A "result" is preferably to be understood herein as a classification of the at least one data time series, in particular of all existing data time series, in particular individually and/or as a whole.

A "warning range" is preferably to be understood herein as a predetermined range, in particular a range of values, which is in particular adaptable or can be adapted, in particular dynamically, in particular by the machine learning algorithm. An "all-clear range" is preferably to be understood herein as a predetermined range, in particular a range of values, which is in particular adaptable or can be adapted, in particular dynamically, in particular by the machine learning algorithm. If a value of a state of the process and/or the state of the multi-axis machine in one embodiment falls within a warning range or an all-clear range, a message, in particular a warning or an all-clear signal, is output accordingly. In one embodiment, a classification in an error class can assume discrete values, in particular multi-level or otherwise discretized, in particular into binary values such as "in order (IO)" or "not in order (NIO)", alternatively continuous values, or the like.

A "state of a multi-axis machine" is preferably to be understood herein as a predetermined parameter, in particular as a predetermined parameter that is of interest when operating a multi-axis machine, in particular with regard to possible sources of error, or as a state that is classified on the basis of training (data) by the machine learning algorithm as, in particular probably, critical for operating and/or continuing to operate the multi-axis machine and/or continuing the process and/or achieving goals with the process, in particular quality goals.

In one embodiment, the result of outputting a warning may indicate an error in the process and/or an error in the robot, or may detect a corresponding error, or may be detected with the result. In one embodiment, an error in the process can be, in particular, a deviation from the desired trajectory, the desired process result, a faulty assembly operation or the like. A fault in the multi-axis machine, in particular a robot, can in one embodiment be wear of at least one gearing, a bearing, a joint or the like, in particular wear on at least one part of the multi-axis machine or in particular of the robot.

Advantageously, in one embodiment, a user can understand what contribution individual existing channels and points in time, in particular time intervals, have to the result or classification. In one embodiment, the result can in particular increase transparency of the algorithms used and further establish or increase trust among users. In one embodiment, the result can reveal potential for improvement, in particular for the process and/or the multi-axis machine. In one embodiment, the method can in particular provide an opportunity to check and/or improve black box algorithms (beyond their classification statistics).

In one embodiment, the invention is based on the approach that machine learning algorithms, in particular neural networks, when the last activation is omitted, can be represented for constant inputs x as a weighted sum (with weights w) of these inputs—sum_i(w_i x_i)+B=y—wherein y is the output before the last activation function (in particular sigmoid and/or softmax) with respect to a class and B is a constant bias term. In one embodiment, "y" can (therefore) be interpreted as a classification value; in particular, if the value of y is high, it can be concluded that this error class is highly likely compared to other error classes, or this can be ascertained using the classification value. Sum_i(w_i x_i)+B describes mathematically exactly what contribution the input makes to the classification value.

Furthermore, in one embodiment, the invention is based on the approach that it can be shown that the weights w_i each represent the derivatives dy/dx_i, in particular, inputs are multiplied by associated gradients in order to determine contributions of these inputs, in particular channels and points in time. Advantageously, in one embodiment, the exact mathematical relationship between the contributions and the classification value can be ascertained: (Sum_i(dy/dx_i*x_i)+B=y), which in particular increases the interpretability. In one embodiment, the averaging of the gradients can advantageously be omitted and, in particular, negative contributions can be taken into account, in particular in comparison with Gradient-weighted Class Activation Mapping (Grad-CAM), which is used for the classification of images and is only partially or not applicable to data time series, in particular of processes and/or multi-axis machines. Grad-CAM is not suitable for the method described herein, in particular because Grad-CAM calculates an activation rating or an activation score for each time interval and channel, which measures the contribution to the classification and in particular assigns a higher activation score to a higher contribution of this channel to the classification. Grad-CAM would therefore require a previously defined limit value for an automated checking of an activation score, which does not exist, or at least is not guaranteed to exist, especially in processes, especially of multi-axis machines, and furthermore in robotic processes. Therefore, Grad-CAM cannot provide a reliable basis for identifying important channels, since the scores can only be understood in relation to the other channels and to the data time series of the entire data set.

With regard to the uncertainty factor B, which can be different for each input and thus can make a comparison of the contributions difficult, the invention is further based in one embodiment on providing a machine learning algorithm, in particular a convolutional neural network, with K layers, which evaluates the data time series channels separately in the first k (with $1<k<K$) layers, in particular of the neural network, and then combines these results in the layers k+1 to K and evaluates them together. In other words, in one embodiment, the inputs xk in layer k can still be assigned to the individual channels and time intervals.

With the knowledge that no bias terms need to be used in layers k+1 to K (convolutions without bias terms and no batch normalization) in order to obtain a classification accuracy, in particular a required or predetermined one, a representation Sum_i(xk_i wk_i)=y without bias term can be used (in one embodiment) for the second part of the neural network. The summands bk_i=xk_i wk_i describe (in one embodiment) the contribution of individual channels in different time intervals to the classification value; in particular, there is no influence on the classification value outside of these summands. This results (in one embodiment) in the fact that the contributions are still different for each data series, but the variance is advantageously reduced by eliminating the bias term. The weights wk_i are (in one embodiment) given by the gradients dy/dxk_i.

In other words, the invention is based in one embodiment on the calculation of the contribution of a channel per data time series and a comparison of the contributions of the channels, in particular across the data set, and in particular with the aid of probability distributions, wherein similar patterns (can) occur in particular in different channels, which should be interpreted differently or are evaluated differently using the method described herein.

In one embodiment, determining an interpretable result further comprises determining a probability with which the state of the process and/or the state of the multi-axis machine corresponds to a value of an error class that is in a warning range or corresponds to a warning range, in particular for the at least one channel and/or for a time interval of the process.

Advantageously, in one embodiment per data time series and/or over the entire data set, interpretable, in particular quantitative statements on the contribution of the at least one channel, in particular on the contribution of the existing channels, can be achieved, in particular by means of the method.

In accordance with one embodiment, probability distributions of their contributions are calculated for each, in particular existing, error class, in particular across a training data set. The contributions bk_i are collected in one embodiment in layer k of the network and can be assigned here to individual channels and/or time intervals.

In one embodiment, the invention is further based on the approach that all contributions are included as summands in the classification value, therefore, in one embodiment, subsets of contributions can be or are arbitrarily combined by forming the sum over the subset, in particular over the entire contribution of a channel (sum over all time intervals of this channel), over the entire contribution of a time interval (sum over all channels in this time interval), the contribution of all channels that monitor a Cartesian coordinate, in particular of the multi-axis machine, and/or combinations of (pre-)determined time intervals and/or channels.

Subsets can preferably be understood herein as the sum of the contributions of a channel in time. Based on the label for a data time series, the contributions of a subset are then classified into error classes, such as IO and NIO, in one embodiment. For each error class, probability distributions are then calculated or ascertained in one embodiment, in particular by evaluating the subset over all n time series, in particular from the training data set, with a result that describes a total of n values distributed over different error classes. In one embodiment, the values of a class are then converted in each case into a probability distribution.

In one embodiment, determining an interpretable result comprises ascertaining an average distance of different error classes with respect to a classification value.

In this way, in one embodiment, a generally valid statement can advantageously be made about the process, in particular about the entirety of the data time series, in particular in the form: "The average distance of channel X corresponds to one third of the average distance between IO and NIO samples in the classification value" or the like. Furthermore, in a development, a statement can advantageously be aggregated mathematically correctly for any time intervals and channels and in particular a statement can be ascertained in the manner of: "In channel X and Y, an error probability of 95% results for this time series in seconds 5 to 10", "The distances of the aggregated channels X, Y and Z correspond to 98% of the average distance between IO and NIO samples in the classification value" or the like.

In one embodiment, the method comprises ascertaining a probability distribution for each, in particular for each existing, error class for a contribution of the at least one channel to the classification value. In a development, a kernel density estimation (Gaussian Kernel Density Estimation) and/or histograms can be used for the probability distribution. In one embodiment, other representations of probability distributions may be used to replace kernel density estimation and/or histograms.

In one embodiment, the method further comprises normalizing the probability distribution of the values of the error class and ascertaining a probability with which a classification value is assigned to a warning range or an all-clear range, in particular is assigned based on the probability distribution.

In one embodiment, this can advantageously, in particular by means of a normalization of the probability distribution, assign a probability of belonging to a specific, in particular existing, error class to a, in particular given, contribution of the at least one channel.

In this way, in one embodiment, a statement such as in particular "A contribution of zero has a probability of 2% in the IO distribution in a channel and a probability of 10% in the NIO distribution and is normalized to 83% of an NIO sample" (here as an example for the case of an IO/NIO classification) or the like can advantageously be made. Advantageously, in an embodiment with the probability distributions, in particular probabilities, an interpretable statement on contributions from different channels to a classification value or a classification in a warning range or an all-clear range can be ascertained; in particular, a confidence level can be ascertained with which an algorithm assumes an assignment in an error class.

According to one embodiment, the method further comprises ascertaining a Wasserstein distance for different error classes. Alternatively or additionally, in an embodiment with an intersection-over-unit metric, an average distance between the (different error classes) or a corresponding distance can be ascertained or if a corresponding distance is ascertained, in particular if the probability distributions are disjoint, in an embodiment the classification can already be carried out on the basis of these distributions with at least substantially 100% accuracy.

Advantageously, this makes it possible to ascertain in one embodiment how far apart the contributions of an error class, in particular of IO and NIO or warning range and all-clear range, are, in particular on average. This allows the importance of subsets of contributions to be ascertained in one embodiment. In other words, in one embodiment, the ascertained distance can advantageously be used as a measure of an importance of a subset of contributions to a classification value.

According to one embodiment, the machine learning algorithm comprises, in particular, a convolutional neural network or is configured as a convolutional neural network. Advantageously, this can enable the algorithm to operate (more) efficiently or to evaluate and/or monitor a process described herein (more) efficiently.

According to one embodiment, the machine learning algorithm, in particular when the machine learning algorithm comprises a convolutional neural network, in particular, has as a last layer a max-pooling layer, in particular over the time dimension.

This makes it possible in one embodiment that each inlet, in particular input, of this pooling layer corresponds to the classification value for the associated point in time, in particular if the maximum value is in particular greater than zero, the data time series is classified as NIO and respectively, in particular if the maximum value is less than zero, the data time series is classified as IO. In other words, in one embodiment, this can make it possible for ranges in which an NIO event has occurred or is to be expected to be marked with a value above zero, or (time) ranges that were not or are not responsible for the NIO classification to be marked as IO. Advantageously, in one embodiment, an accuracy of localization of important time intervals, in particular for classification, in a data time series can be increased or is thereby increased, in particular in comparison to convolutional neural networks with a differently configured last layer. Furthermore, in one embodiment, this can make it possible for the contributions ascertained or calculated per time and channel to be allocated to the probability distributions for IO and/or NIO based on the classification values per time; in particular, this can subsequently enable the classification of the contribution and/or of the contributions of a new data time series for each time interval. Advantageously, in one embodiment, it is made possible that a statement such as "In channel X, there is an error probability of 5% in seconds 5 to 10, and in seconds 20 to 25, this is 95%" or the like is ascertainable or can be ascertained, in particular is ascertained, as an interpretable result.

According to one embodiment, the method further comprises evaluating and/or monitoring a process and/or a multi-axis machine. Advantageously, in one embodiment, this can make it possible for the process to be carried out (more) quickly and/or (more) precisely, in particular for errors in the process to be noticed (more) quickly, and furthermore in particular for errors to be remedied, and in particular for errors to be predicted by means of the machine learning algorithm. Advantageously, in one embodiment, this makes it possible for wear of the multi-axis machine to be localized (more) quickly and/or (more) precisely, in particular for an erroneous execution of a process by the multi-axis machine to be ascertained, in particular for it to be predicted by means of the machine learning algorithm.

According to one embodiment, the method comprises a step of evaluating and/or monitoring the process and/or the multi-axis machine. Furthermore, in one embodiment, the method comprises outputting a warning, stopping and/or changing the process, in particular outputting a request for maintenance of the machine and/or execution of a maintenance step, in particular a (re-)calibration in particular of the machine and/or the means for recording the at least one data time series. Furthermore, in one embodiment, the method comprises repeating the process, in particular in a modified form.

This can make it possible in one embodiment for the process and/or the multi-axis machine to be (less) susceptible to errors, in particular to be (more) robust against errors According to one embodiment, the machine learning algorithm or another algorithm is configured to predict the error class, in particular a classification value, of a data time series from the calculated contributions; in particular, they can be trained to do so or are trained to do so.

According to one embodiment, the process is a process that is or can be carried out by at least one multi-axis machine, in particular at least one robot. In one embodiment, the multi-axis machine is a robot.

According to one embodiment of the present invention, a system is provided for operating and/or monitoring at least one multi-axis machine, in particular at least one robot, which is designed to carry out a method according to one of the preceding claims. In one embodiment, the system comprises at least one multi-axis machine and/or at least one robot.

In one embodiment, the system comprises means for recording at least one data time series. Furthermore, in one embodiment, the system comprises means for determining an interpretable result by means of a machine learning algorithm, in particular based on the at least one data time series. In one embodiment, the means for recording at least one data time series is at least one sensor or is designed as a sensor.

Furthermore, in one embodiment, the system comprises means for determining a probability with which the classification value of the state of the process and/or the state of the multi-axis machine corresponds to a value of an error class that is in a warning range or corresponds to a warning range, in particular for the at least one channel and/or for a time interval of the process.

In one embodiment, the system comprises means for ascertaining an average distance of different error classes with respect to a classification value.

In one embodiment, the system comprises means for ascertaining a probability distribution for each, in particular existing, error class for a contribution of the at least one channel to the classification value.

In one embodiment, the system comprises means for normalizing the probability distribution of the values of the error class and ascertaining a probability, in particular with which a classification value is assigned to a warning range or an all-clear range, in particular is assigned based on the probability distribution.

In one embodiment, the system comprises means for ascertaining an average distance for different error classes.

In one embodiment, the system comprises means for evaluating and/or monitoring the process and/or the multi-axis machine and, in particular, if a warning is output when determining the result, stopping and/or changing the process and/or maintaining the multi-axis machine, in particular repeating the process, further in particular in a modified form.

A system and/or a means in the sense of the present invention may be designed in hardware and/or in software, and in particular may comprise at least one, in particular digital, processing unit, in particular microprocessor unit (CPU), graphic card (GPU) or the like, which is preferably data-connected or signal-connected to a memory system and/or bus system, and/or one or multiple programs or program modules. The processing unit may be designed to process commands that are implemented as a program stored in a memory system, to detect input signals from a data bus and/or to issue output signals to a data bus. A memory system may comprise one or more, in particular different, storage media, in particular optical, magnetic, solid-state, and/or other non-volatile media. The program may be designed in such a way that it embodies or is capable of carrying out the methods described herein, so that the processing unit is able to carry out the steps of such methods and thus, in particular, is able to operate or monitor the machine.

In one embodiment, a computer program product may comprise, in particular be, an, in particular computer-readable and/or non-volatile, storage medium for storing a program or instructions or with a program stored thereon or with instructions stored thereon. In one embodiment, execution of said program or said instructions by a system or controller, in particular a computer or an arrangement of multiple computers, causes the system or controller, in particular the computer(s), to carry out a method described herein or one or more steps thereof, or the program or instructions are configured to do so.

In one embodiment, one or more, in particular all, steps of the method are implemented completely or partially automatically, in particular by the controller or its means.

In one embodiment, the system comprises at least one, in particular the, multi-axis machine and/or at least one robot.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
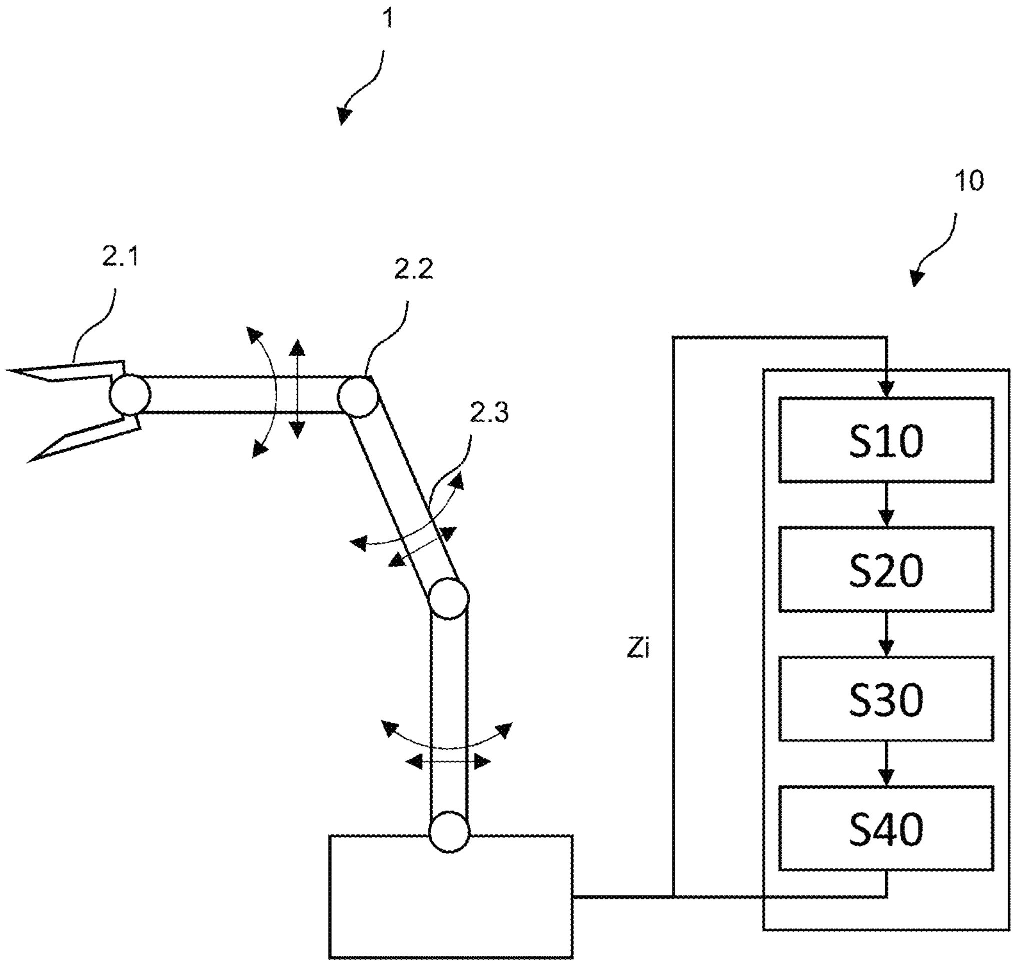
FIG. 1 schematically depicts a multi-axis machine which is monitored, in particular controlled, by a method according to an embodiment of the present invention.

FIG. 1 shows a multi-axis machine 1 which is monitored, in particular controlled, by a method 100. The multi-axis machine 1 of FIG. 1 is shown by way of example as a robot. The robot comprises, by way of example, means 2 for recording S10 at least one data time series Zi. In FIG. 1, various means for recording the at least one data time series Zi are shown schematically as examples, in particular state sensors 2.1, which preferably record or can record a state of at least a part of the multi-axis machine 1 or are in particular configured to do so; in particular force and/or torque sensors 2.2 or the like, which preferably record or can record a force and/or torque or the like or are configured to do so, and position sensors 2.3, which record or can record a position or pose or its temporal derivatives, in particular speed and/or acceleration, or are configured to do so, in each case in particular over time. The recorded data time series Zi are transferred to means for determining S20 an interpretable result, in particular sent in data communication, in particular retrieved by them.

Figure 2:
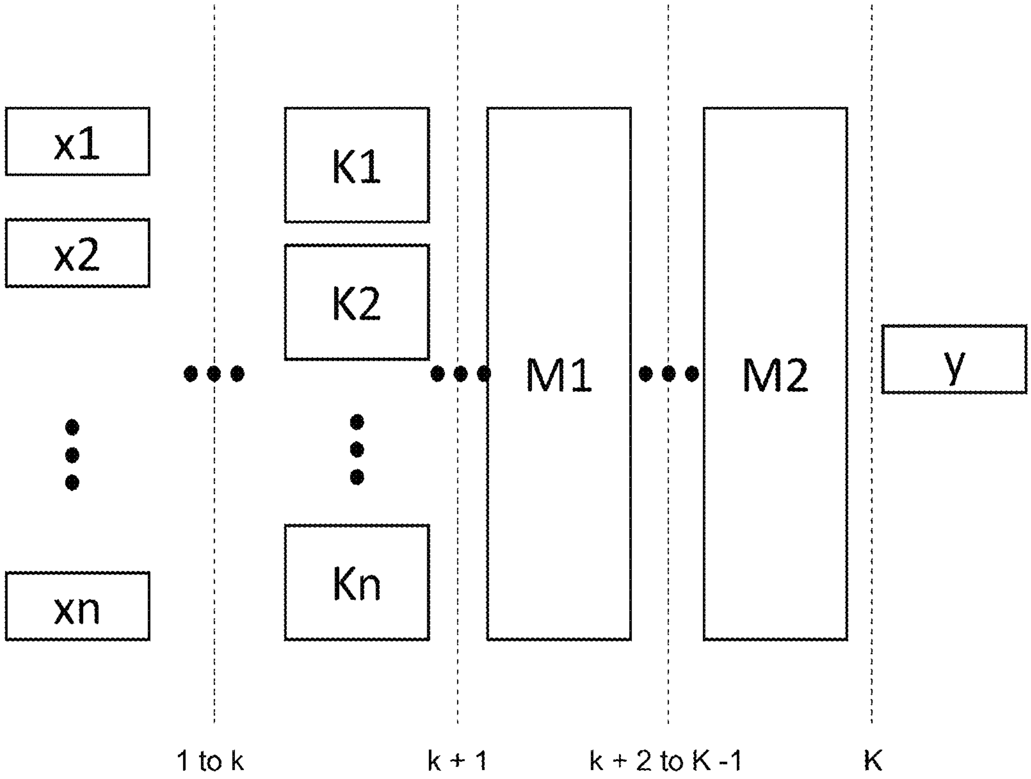
FIG. 2 shows the schematic structure of a neural network according to an embodiment of the present invention.

FIG. 2 shows a schematic representation of an artificial neural network with different layers and inputs x1 to xn, which enter layers 1 to k, represented here by a dashed line or three dots. K1 to Kn represent the channels present in at least one data time series, which are (initially) evaluated separately. This is followed by convolutional layers from k+1 to k+2 and k+2 to K−1 with an (intermediate) result M1 and M2, which are applied as described herein, without bias terms and/or batch norm layer. Y represents an output that describes an interpretable result, preferably and/or advantageously enables it. This result is provided after layer K.

Figure 3:
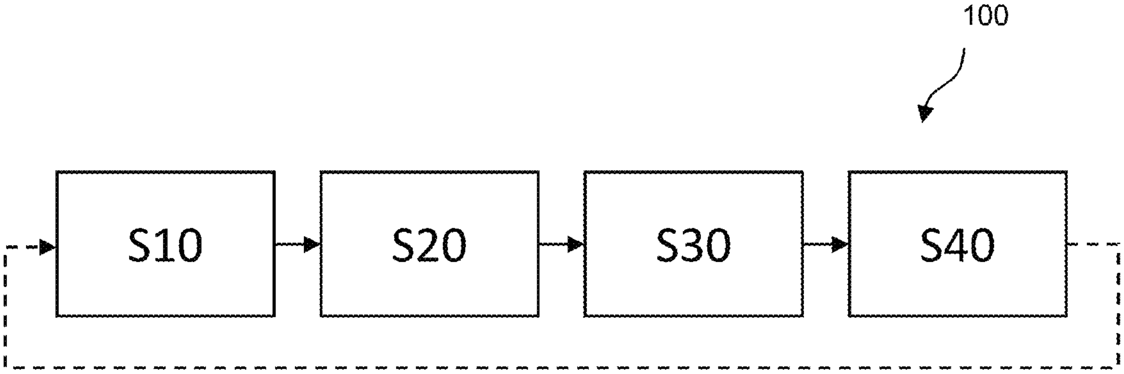
FIG. 3 shows schematically a method according to one embodiment of the present invention.

FIG. 3 schematically shows a method 100 for evaluating and/or checking a process and/or for evaluating and/or checking a multi-axis machine 1, in particular for controlling the process and/or the machine. The method comprises, by way of example, several method steps, wherein the recording of at least one data time series Zi is represented by S10. Furthermore, FIG. 3 shows the determination of an interpretable result with S20. If the result describes a value that is within a warning range, a warning is output. If the result describes a value that is within an all-clear range, an all-clear signal is output. This is shown in each case with S30. S40 schematically represents the evaluation and/or monitoring, in particular control of the process and/or the multi-axis machine. The method can preferably be repeated, as shown by the dashed arrow in FIG. 3, in particular with a modified process, a recalibrated multi-axis machine and/or a serviced multi-axis machine, or the like.

Although exemplary embodiments have been explained in the preceding description, it is pointed out that a large number of modifications is possible. It is also pointed out that the exemplary embodiments are merely examples that are not intended to restrict the scope of protection, the applications, and the structure in any way. Rather, the preceding description provides a person skilled in the art with guidelines for implementing at least one exemplary embodiment, with various changes, in particular with regard to the function and arrangement of the described components, being able to be made without departing from the scope of protection as it arises from the claims and from these equivalent combinations of features.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

1 Multi-axis machine
2 Means for recording data time series
2.1, 2.2, 2.3 Exemplary means for recording data time series, in particular sensors
10 System
100 Method
S10 Recording at least one data time series
S20 Determining an interpretable result
S30 Outputting a warning or all-clear signal
S40 Evaluating and/or monitoring, in particular controlling, the multi-axis machine
x1 . . . xn Inputs
K1 . . . Kn Channels
M1 Intermediate result of the first convolutional layers
M2 Intermediate result of the second convolutional layers
y Output/interpretable result

The invention claimed is:

1. A method for evaluating and/or monitoring a multi-axis machine and/or a process of a multi-axis machine, the method comprising:

recording at least one data time series obtained from the multi-axis machine or from a process performed by the multi-axis machine;

wherein the at least one data time series comprises at least one channel describing at least one parameter of the process and/or of the multi-axis machine, and wherein the at least one data time series is caused by the process;

determining an interpretable result using a machine learning algorithm based on the at least one data time series, wherein the result describes a classification value of a state in the process and/or of a state of the multi-axis machine;

outputting a warning when determining the result in response to the classification value being assigned to a value of an error class that is in a warning range or corresponds to a warning range; and outputting an all-clear signal in response to the classification value being assigned to a value of an error class that is in an all-clear range or corresponds to an all-clear range.

2. The method of claim 1, wherein determining an interpretable result further comprises:

determining a probability with which the classification value of the state of the process and/or the state of the multi-axis machine corresponds to a value of an error class which lies in a warning range or corresponds to a warning range, in particular for the at least one channel and/or for a time interval of the process.

3. The method of claim 1, wherein determining an interpretable result further comprises:

ascertaining an average distance of different error classes with respect to a classification value.

4. The method of claim 1, further comprising:

ascertaining a probability distribution per error class for a contribution of the at least one channel to the classification value.

5. The method of claim 4, further comprising:

normalizing the probability distribution of values of the error class; and determining a probability with which a classification value is assigned to a warning range or an all-clear range, in particular based on the probability distribution.

6. The method of claim 1, wherein the machine learning algorithm is an artificial neural network, in particular a convolutional neural network.

7. The method of claim 6, wherein the convolutional neural network comprises a max-pooling layer as a last layer, in particular a max-pooling layer over the time dimension.

8. The method of claim 1, further comprising:

evaluating and/or monitoring the process and/or the multi-axis machine; and in response to a warning being output when determining the result, then at least one of:
stopping the process,
changing the process,
maintaining the multi-axis machine,
repeating the process, or
repeating the process in a modified form.

9. A method for evaluating and/or monitoring a process and/or a multi-axis machine, wherein the method comprises:

recording at least one data time series, wherein the at least one data time series comprises at least one channel describing at least one parameter of the process and/or of the multi-axis machine, and wherein the at least one data time series is caused by the process;

determining an interpretable result by means of a machine learning algorithm based on the at least one data time series, wherein the result describes a classification value of a state in the process and/or of a state of the multi-axis machine;

wherein a warning is output when determining the result if the classification value of the state in the process and/or of the state of the multi-axis machine is assigned to a value of an error class that is in a warning range or corresponds to a warning range and an all-clear signal is output if the classification value of the state in the process and/or of the state of the multi-axis machine is assigned to a value of an error class that is in an all-clear range or corresponds to an all-clear range; and ascertaining an average distance, in particular a Wasserstein distance, alternatively with an intersection-over-unit metric, for different error classes.

10. A system for operating and/or monitoring a multi-axis machine, the system comprising:

a machine controller configured to carry out a method according to claim 1.

11. A non-transitory, computer-readable storage medium storing program code, the program code, when executed by a computer, causing the computer to carry out the method according to claim 1.

* * * * *